Sept. 12, 1939.  G. M. BUCHARD  2,172,953
TUBE TESTER
Filed June 15, 1938
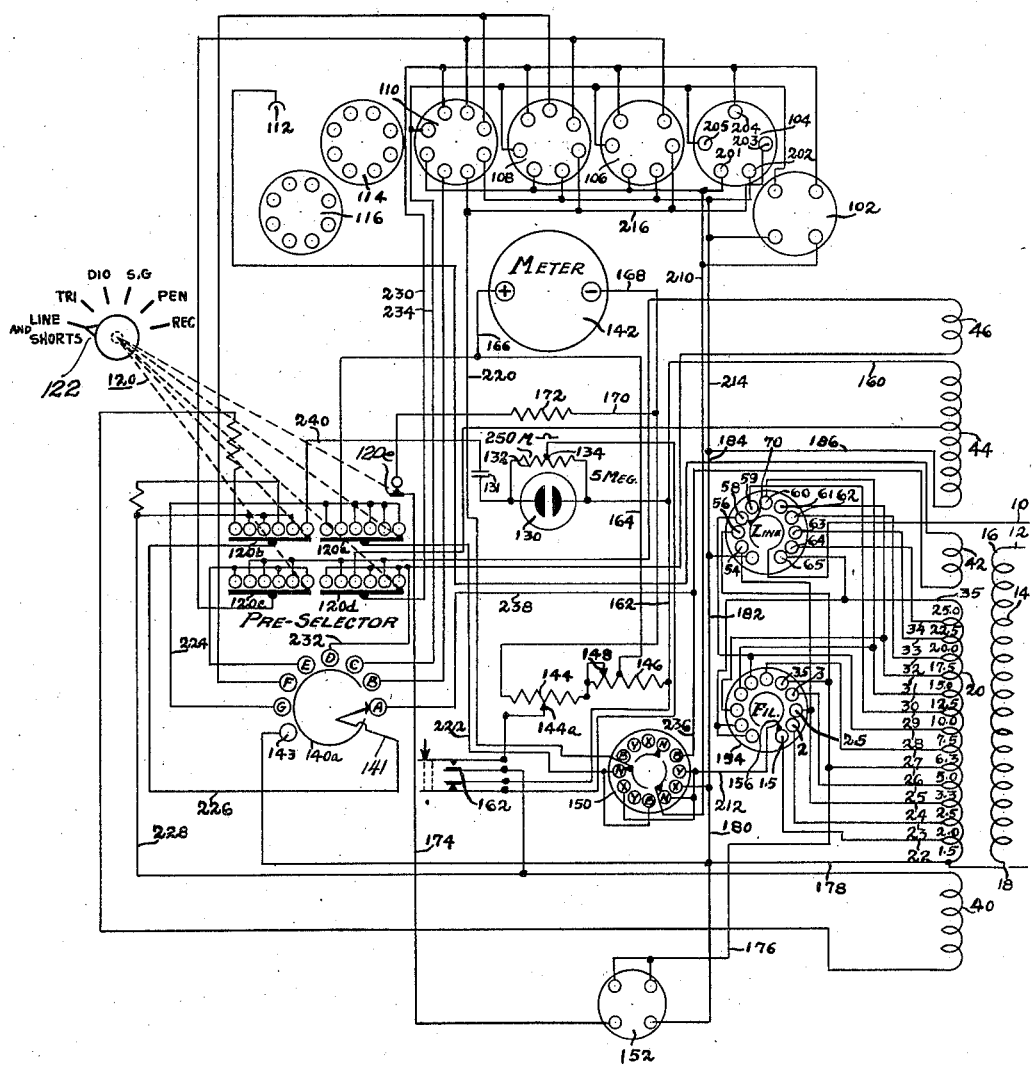
INVENTOR
George M. Buchard
BY
Henry G. Dobois
ATTORNEY Patented Sept. 12, 1939

2,172,953

UNITED STATES PATENT OFFICE 2,172,953

TUBE TESTER

George M. Buchard, Dayton, Ohio

Application June 15, 1938, Serial No. 213,947

10 Claims. (Cl. 250—27)

This invention relates to tube testers and more particularly to the circuits used in universal tube testers.

An object of this invention is to provide a preselector switch arrangement for connecting one or a plurality of tube sockets into a circuit so that one position of the switch arranges the circuit for testing all tubes of a general class such as triodes, another position arranges the circuit for testing all tubes of another general class such as pentodes, et cetera, in this manner any tube having the required number of functional electrodes being in test position in the circuit only when the switch is in the one position for testing the dynamic output characteristic of the tube.

Another object of this invention is to utilize a glow tube for measuring the tube under test for short circuits or excessive leakage currents.

Another object of this invention is to regulate the sensitivity of the glow tube.

Another object of this invention is to provide a switching device and circuit network wherein one position of the switch is used for testing all normal tubes and another position of the switch is used for testing ballast tubes.

Another object of this invention is to provide a circuit network and a switch therein having a multiplicity of positions, one of which is used when testing normal tubes, another position selected from a plurality of positions being used for testing tubes having unusual characteristics.

Another object of this invention is to provide one switch for connecting several sockets adapted to be used in testing any tube having a predetermined number of electrodes and a second switch for connecting the circuit selected by the first switch to a circuit network suitable for analyzing the particular tube under test.

Another object of this invention is to provide a secondary voltage transfer ratio selector.

Another object of this invention is to provide duo-functional taps or outlets on the secondary of the power transformer, some of which are selected for energizing the filament of the tube under test and others or the same selected to alter the voltage transfer ratio.

Another object of this invention is to provide a tube tester for measuring the dynamic output and the interelectrode leakage of the tube.

Other objects and advantages reside in the construction of parts, the combination thereof and the mode of operation, as will become more apparent from the following description.

The single drawing discloses a schematic and a diagrammatic circuit diagram of the network of the circuits utilized in the tube tester.

The tube tester shown herein is utilized to perform two tests upon each tube, one to determine whether or not the tube is short circuited, or the impedance is such that an excessive leakage current flows through the tube. This has been accomplished by the use of a glow tube associated with means for adjusting the sensitivity thereof. The second test may be referred to as a dynamic test, which may be a test of the current flowing through one or several of the electrodes of the tube, depending entirely upon the nature of the tube and its use. Dynamic test, as used herein, designates a test wherein the electrodes of the tube are energized from sources of voltages simulating sources of voltage found under normal operating conditions, that is, the sources of voltages are independent with respect to each other as far as consistent with the operation of the tube, much the same as the sources of the voltages are independent of each other in a radio receiver. In conducting several of these tests, alternating voltages are utilized instead of rectified or direct voltages used under actual operating conditions.

This has been accomplished in a novel circuit arrangement wherein a plurality of sockets having various prong spacings to accommodate various types and makes of tubes are interconnected into a circuit network through a preselector switch, which connects several of the sockets for use in testing all makes of tubes of the same general class. The circuits selected by one setting of this preselector switch are so connected to the various sockets that any of the tubes of the same general class may be tested when the preselector switch is in this one position and only in this position, with only one exception, and that is, the preselector switch has a second position wherein any type of a tube may be inserted into its particular socket for testing for short circuit and excessive leakage currents. A third position of the switch connects several of the sockets into circuit networks adapted for testing all types of tubes of another general class. For example, the first position of the preselector switch may be used in testing a general class of tubes such as triodes, that is, tubes with three electrodes, generally referred to as the cathode, the anode and the control grid. The third position of the preselector switch, may be used in testing all screen grid tubes. The triodes are tested only when the preselector switch is in the one position, as far as the dynamic output is concerned.

Associated with the preselector switch is a circuit switch, which is used to connect the proper auxiliary circuits into the circuits selected by the preselector switch.

A third switch is provided with several positions, one of which may be designated as the normal tube testing position, which connects into the circuit network certain voltages to certain electrodes that are used in testing normal tubes. Special tubes may be tested, such as ballast tubes, by merely turning the last referred to switch to the ballast tube testing position. This switch may be provided with a plurality of special terminals that may be used for connecting into the circuit network portions of circuits necessary for conducting special tests or for testing special types of tubes that do not require the same conditions as the normal tubes require. For the purposes of clarification, this last switch will be referred to as having normal position, ballast position and X—Y positions, where X—Y positions take care of extraordinary circuit requirements.

In order to have readings that are accurate, it is quite desirable to maintain a constant voltage drop across the terminals of the primary winding of the power transformer. This has been accomplished by providing a secondary for the power transformer, the winding of which has a plurality of taps connected into a switch having one terminal connected into one side of the input of the primary, the secondary winding being connected to the other terminal of the primary winding, so that the voltage drop across the line is divided between the primary and the secondary winding, a tap on the secondary winding being selected, which causes a division of the input voltage to be such that the voltage drop across the primary may be adjusted to a constant value.

*Power supply*

The tube tester circuit arrangement is connected by a pair of lines 10 and 12 to a suitable source of A. C. voltage or power. The voltage or power is impressed upon the transformer including a primary winding 14 having one terminal 16 connected to the line 12 and the other terminal 18 connected to a secondary winding 20, having a plurality of taps 22 to 35 inclusive. In addition thereto, a plurality of secondary windings 40, 42, 44 and 46 are excited from the primary winding. The line voltage may fluctuate. It is very desirable that a constant voltage be impressed upon the primary winding 14 in order to obtain reliable readings.

*Secondary voltage transfer regulator*

In the particular embodiment disclosed, the taps 24, 26 and 28 to 35 are connected to switch terminals 54, 56 and 58 to 65. Taps 25 and 27 represent odd voltages other than voltage steps of two and one-half volts. The contact arm 70 of the line voltage control switch is connected in series with the line 10. If, for example, the input voltage across the lines 10 and 12 is 105 volts and it is desirable to have the voltage drop across the primary winding equal to 100 volts, the contact arm 70 may be adjusted to the terminal 56 so as to cause a voltage drop of 5 volts across a portion of the secondary winding in series with the primary winding. If the input voltage happens to be 115 volts, the contact arm 70 may possibly be adjusted to the contact 61, so as to cause 15 volts of voltage drop across the portion of the secondary in series with the primary, so as to leave the voltage drop of 100 volts across the primary. The power input supplied by the several windings of the secondary of the transformer is connected to a number of sockets 102, 104, 106, 108 and 110 through a suitable network including the preselector switch, glow tube sensitivity regulator, the auxiliary circuit selecting switch, current indicating device, normal-special test circuits and filament voltage control, which will now be described in the order enumerated.

*Sockets*

The socket 102 may be used in testing certain tubes such as diodes and possibly special tubes such as ballast tubes and the like. The socket 104 may be used, for example, for testing certain triodes and pentodes. The other sockets may be used for diode, triode, screen grid, pentode tubes and any type of a tube fitting into the socket either with or without a terminal on the opposite end of the tube. If the control grid is connected to the opposite end of the tube, this may be connected through the cap 112. For convenience in taking care of additional tubes other than those that are announced at present, a pair of spare sockets 114 and 116 have been shown. These may be connected into the circuit by a suitable circuit arrangement to be determined after the new tubes are announced.

No attempt is now made to identify the various terminals within the tube sockets associated with the various electrodes, for the reason that the same socket when used in testing one type of tube may have a certain terminal connected to the cathode, another to the anode and a third to the control grid, et cetera, and a pair of terminals to the filament current. Another type of tube may connect the filament terminals to what was formerly used as the cathode and the anode terminals, that is, the designation for terminals for one type of tube may not be the same as the designation for the terminals of another type of tube. The terminals in the sockets may be used for one electrode in one type of tube and some other electrode in another type of tube, as is well known to those skilled in the art.

*Preselector switch*

Some of the terminals of the sockets 102 to 110 are connected to a preselector switch provided with four groups of six terminals each and an extra terminal constituting the fifth group. The number of groups and the number of terminals in each group may be varied to meet various requirements. This has been designated by the switch arrangement 120, having the groups of terminals represented by 120a, 120b, 120c, 120d and 120e. Although these have been shown in a straight line in the drawing, in actual practice they are circumferentially arranged and controlled by a switch pointer knob 122 registering with certain indicia on the dial provided with a code which may, for the purposes of illustration, include the following: Rec for rectifier; Pen for pentode; S. G. for screen grid; Dio for diode; Tri for triode and Line and Shorts for excessive leakage and short circuits. This Line and Shorts position also arranges the circuits so that the milliammeter may be used to measure line voltage impressed upon the power transformer. This will be described more fully later.

As the pointer or knob 122 is turned to one of the indicia, the sockets are properly connected to the selector switch for testing rectifier, pentode, screen grid, diode or triode tubes respectively. The order of the indicia is optional. Any other suitable code could be used. The above is merely shown for the purposes of illustration. By turning the knob 122 to the indicia designated Line and Shorts, as shown in the drawing, all of the sockets have one terminal connected in series with a glow tube 130, which may be of the neon type, or any other gas filled tube requiring a predetermined voltage applied to the terminals thereof before it will glow, this voltage depending upon the sensitivity of the selected circuit associated with the glow tube 130, which circuit will now be described.

The Line and Shorts position of the switch, as shown in the diagram, may be traced as follows: One terminal of the transformer winding 44 is connected to the lead 160 that is connected in series with the glow tube 130 through a condenser 131 through the lead 240 to the contact 120b that is now closed. The contact 120b is connected by a lead 226 into the switch contact 140. When the contact 140 is connected to the terminal A in this switch, this terminal A, as may be seen by referring to the drawing, is connected by a lead 238 and a lead 236 to the ballast contact in the switch 150. The lead 238 is also connected to the lower terminal of the winding 42 having its other terminal connected by a suitable lead to the grid contact 112. By rotating the switch 140 so as to contact B, this contact is connected by a lead to one prong in the socket 110. By rotating the switch 140 so as to engage the contact C, it can be readily seen that this contact C connected by a lead 234 connects one prong of each of the five sockets shown into this circuit. Thus, it is seen that by adjusting the preselector switch into the Line and Shorts position and rotating this switch 140 through the several contacts, various prongs or connections of the tubes are connected in series with the glow tube 130 and the winding 44.

By rotating the pointer 122 from the Line and Shorts position shown in the drawing to the next position indicated by Tri, which may stand for triode, the contact in the switch 120 is disconnected and the contacts 120a, 120b, 120c and 120d are then shifted from the contact of each shown to the extreme right to the first contact in each switch immediately to the left. By continuing the rotation of the pointer 122 to any of the other indicia, the contacts 120a, 120b, 120c and 120d are advanced to the corresponding switching positions, at which time the contact 120e remains open. Contact 120e is only closed when the pointer 122 is in the Line and Shorts position.

*Glow tube sensitivity regulator*

The leakage current or the short circuit current flows through a resistance element 132 arranged in parallel with the glow tube 130. The blocking condenser 131 is connected in series with the glow tube 130 and the resistance element 132 so as to prevent the normal direct current components flowing through some of the electrodes from passing through the glow tube. In other words, the glow tube 130 will merely measure alternating currents flowing through the circuit. This alternating current component produces a voltage drop across the resistance element 132. This voltage drop is impressed upon the terminals of the glow tube 130. This resistance has been provided with a tap 134, which may function as a voltage reducing device when connected into the circuit. This tap, which is symbolic of a plurality of taps, or a variable tap, is used to change the sensitivity of the glow tube.

When the circuit is used in testing ballast tubes, there are primarily two tests to be conducted. The one test is to determine whether or not the resistance elements of the tube are open circuited and the other is to determine whether or not the tube is short circuited. When a test is made upon a ballast tube to determine whether or not the resistance elements are open circuited, the glow tube 130 will be illuminated when the ballast tube is functioning properly, that is, when the resistance elements are connected in series with the glow tube. This is an exception to the normal operation of the glow tube in the circuit.

*Auxiliary circuit selecting switch*

The auxiliary circuit selecting switch includes a movable contact 140 mounted for rotation and is connected with the contact arm terminal 141. In addition thereto, this auxiliary circuit selecting switch includes a movable contact strip 140a connecting together all of the contacts and all of the circuits connected to the circuit selecting switch excepting the particular circuit terminal that is connected to the movable contact 140. In the position shown, the contact 140 is connected to the terminal A. When in this position the contacts B, C, D, E, F, G and 143 are all connected together into a common circuit. If, for example, the contact 140 is moved so as to contact terminal D, then contact D is connected to 141 through the contact 140. The contacts A, B, C, E, F, G and 143 are then connected together into a common circuit.

When making the short circuit and excessive leakage tests, the contact 140 is preferably rotated so as to connect the several terminals into the glow tube circuit, one terminal being connected to the glow tube circuit at a time. This permits testing each of the electrodes in the tube under test for short circuit or excessive leakage currents. When conducting tests upon the tube and the preselector switch is in position for testing the selected tube, the contact 140 is utilized to select the element of the tube that it is desired to meter, that is, the switch selects the normal circuit used in testing the particular tube under test. When this contact is connected to the particular selected terminal, all of the other terminals of the switch are short circuited.

*Current indicating device*

The output from one of the electrodes of the tube may be connected through a variable resistance 144 and a fixed resistance 146 provided with an adjustable calibration contact 148. The resistance 144 has the adjustable contact 144a adjusted to a position so as to cause the reading to fall upon the proper zones of the milliammeter 142. The variable resistance 144 is connected in parallel with the milliammeter 142, so as to shunt part of the current. The relative ratios of the currents flowing through the resistance 144 and the milliammeter 142 are dependent entirely upon the adjustment of the resistance 144.

*Line voltage control circuit*

Whenever the preselector switch is turned to the Line and Shorts position, the milliammeter 142 is switched out of the testing circuit, that is, it is switched out of the circuits including the tube sockets; but instead, is connected in series with the winding 44 through the leads 160 and 162, the fixed resistance 146, the leads 164 and 166, the milliammeter 142, the leads 168 and 170, the resistance 172, the contact 120e, the lead 174, the rectifier 152, the lead 176, portions of the windings of the secondary, the leads 178, 180, 182, 184 and 186 to the opposite terminal of the winding 44. The line control switch 70 may then be adjusted so as to keep the reading across the milliammeter 142 at a predetermined value.

Normal-special test circuits

In addition to the preselector switch 120 and the auxiliary circuit switch 140, the tube tester has been provided with a normal-special test circuit switch 150 having a plurality of terminals which may be designated N, X—Y and B, wherein N designates the circuit used in testing normal tubes, B the circuit used in testing ballast tubes and X—Y special circuit tests for use with tubes having unusual characteristics. This switch is used to take care of filament terminal mislocation and other than filament terminals located in the positions found in standard tubes.

Filament voltage control

The filament voltage that is supplied to the sockets is adjusted by the switch 154 having a plurality of voltage designations such as 1.5, 2.0, 2.5, et cetera, as indicated on this switch. If, for example, a tube has a normal filament voltage of 2.5 volts, this switch is adjusted so that the indicant registers with the 2.5 volts indicia.

Mode of operation

After ascertaining the type of tube to be tested, the filament voltage switch is rotated to the proper filament voltage value. The preselector switch is rotated to the Line and Shorts position. When in this position, the milliammeter 142 is connected in series with the secondary winding 44, so that the operator may measure the line voltage to thereby determine whether or not the proper line voltage is impressed upon the terminals of the power transformer. If this voltage is either too high or too low, the line control contact 70 is adjusted to a position where the current flowing through the milliammeter 142 is of the proper value. The tube to be tested is now inserted into the socket fitting the particular tube. If this tube is a thermionic vacuum tube, the test proceeds as follows.

While the preselector switch is in the Line and Shorts position, the contact 140 is rotated into contact with the terminals A, B, C, D, E, F and G, so as to determine whether or not any of the electrodes in the tube under test are short circuited, or if any of the electrodes carry excessive leakage currents. If the electrodes are short circuited, the glow tube 130 is brightly illuminated. It gives off a bright light. The position of the contact 140 at the time that the glow tube 130 is illuminated indicates the particular electrode that is short circuited. From this, however, it cannot be determined how it is short circuited. This is immaterial, as all of the other electrodes in the tube are connected into a common circuit. If the glow tube has a dull glow, it indicates leakage currents flowing through the glow tube. In most cases this indicates excessive leakage currents, that is, a bad tube. The operator may refer to the chart accompanying the tube tester to determine whether or not the normal leakage currents for the particular tube are sufficiently great to energize the glow tube for the particular setting of the resistance 132. If the leakage current in the normal operation of the tube exceeds a predetermined value, the glow tube 130 will show a faint glow. This, however, can be eliminated if desirable, by selecting proper values for the resistance 132 or properly adjusting the contact 134, if this is adjustably connected.

If the tube is found to have no short circuits and the leakage currents through the several electrodes are not excessive, tests upon the several electrodes will now be made. The preselector switch 120 is rotated to the proper position. If, for example, a triode is tested, the pointer 122 is rotated to the indicia Tri. This connects all of the tube sockets into the circuits used in testing normal types of triode tubes. The normal switch 150 remains in the normal position when making normal tests. Special tests will be discussed more fully later. The switch 150 being in normal position, assuming that the tube under test is a normal tube, and the preselector switch registering with the proper indicia, the test may now proceed by connecting the contact 140 to the proper terminal, so as to connect the proper circuit through the milliammeter 142. The reading is then taken, after adjusting the resistance 144 to the proper value, as determined from the chart for the particular tube under test. This will cause the current flowing through the milliammeter 142 to be of the proper value if the tube functions properly. The contact 140 may be adjusted to several positions for the same tube, for example, if a double anode tube is tested, the contact 140 is first rotated to measure the current flowing through one of the anodes and then is rotated to measure the current flowing through the second anode. If it is a screen grid tube, the contact 140 may be rotated so as to read the current flowing through the normal anode circuit of the tube. If, in addition to these electrodes, the tube includes a diode plate, such as found in duofunctional tubes, the contact 140 may be rotated to the position so as to read the current flowing through the diode plate. In some types of tubes the filament terminals are not arranged the same with respect to the terminals of the sockets as in the majority of tubes. In this event, the normal switch, as indicated by the chart accompanying the tube tester, is rotated either to the X position or to the Y position, which shifts the circuit so as to connect the proper terminals to the filament. This adjustment should be made before the tube is inserted into the circuit, so as to insure the proper filament voltage being supplied to the filament in the tube under test.

Let it be assumed that the tube has been connected into the socket 104. It can be readily seen from the circuit diagram that the prong terminals 201 and 202 function as filament terminals. The terminal 201 is connected through a lead 210 connected through one of the movable contacts in switch 150 arranged in series with leads including the lead 212, terminating in the movable contacts of the switch 150 connected to the contact 156, which happens to be in a position so as to be energized from 1.5 volts in the filament switch through the lead 212. The prong terminal 202 is connected through a lead 214 to the lead 186 to one end of the secondary winding of the transformer. It is to be noted that the normal special test switch 150 is in the normal position.

In order to check the current flowing through the electrode terminating in the prong terminal 203, the circuit selecting switch contact 140 is turned to the G position. Then the circuit through the contact 203 extends through the leads 216, the lead 220 that is connected through a contact in the normal test switch to a lead 222 connected to the contact contacting the group of terminals 120a. All of the contacts in this group, with the exception of the fifth from the right which is directly connected to the milliammeter 142, are connected through a lead 224 to the contact terminal G, where the circuit is completed through the contact 140 through a lead 226 to the contact contacting the group of terminals in 120b, all of which, excepting one, are directly or indirectly connected through a lead 228 through the switch 162 to the resistance contact 144a, thence through the lead extending from the left of the resistance 144 up through lead 168 through the milliammeter 142. From the milliammeter the circuit is completed through the lead 166 down through 164 connected to a terminal between the resistance 144 and resistance 146, where the current flows through the resistance 146, through the lead 162, through the lead 160 energized from the winding 44. The other terminal of the winding 44 is connected through the lead 186 through the lead 214 to the filament terminal 202.

In testing the electrode connected to the prong terminal 204, the contact 140 is rotated to the D position. The circuit then includes the lead 230 connected to the contact of the preselector switch 120, designated 120d, where several positions are connected either directly or indirectly to the contact D through a lead 232, so as to complete the circuit through the milliammeter 142. The electrode connected to the prong terminal 205 may be tested by connecting the contact 140 to the position C, that is connected directly to the contact 204 through the lead 234, where the circuit is completed through the milliammeter 142, as before explained. This is merely used for the purpose of illustration to show the circuit arrangements for testing one type of a tube, for example, a triode tube.

In testing ballast tubes, only two tests are made, one to ascertain whether or not the tube is open circuited and the other to determine whether or not the tube is short circuited. Many ballast tubes are made with a number of prongs, where only two or three prongs are utilized in the circuits, the others being merely dummy prongs for the purpose of fitting the ballast tube into the socket. It has been found that as a rule if there are short circuits in the ballast tubes, these may be detected by connecting one prong that is energized to the dummy prongs. If a current flows through the dummy prongs, it indicates a short circuit.

For the purpose of illustration, let it again be assumed that the ballast tube fits the socket 104. Furthermore, let it be assumed that the circuit is completed through the prongs 201 and 203. The preselector switch is rotated to Line and Shorts position, where it remains throughout the entire test of the ballast tube. The special test switch 150 is now rotated to close the contacts through the terminals marked B. This connects the prong terminal 201 through the lead 210 extending through the contact of switch 150, through the contact terminal B to terminal A in the circuit switch by means of the leads 236 and 238. The circuit from the prong 201 is then completed through the glow tube 130 as follows: from 201 through the lead 210, through the movable contact switch 150 shown towards the right of the schematic showing of this circuit now in contact with terminal B, through the leads 236 and 238 to the contact A, having its contact arm connected in series with the lead 226 connected to the movable contact of the group of terminals 120b to the first terminal of this group towards the right, which is connected through a lead 240 through the blocking condenser 131 to the glow tube 130. From the glow tube 130 the circuit extends through the lead to the right up through the lead 160 through the winding 44 through the lead 186 down through the leads 184, 182, 180 to the juncture below the switch 150, then through the lead extending to the left and terminating at 143. When the contact 140 is in the position A, contact 143 is connected to contacts B, C, D, E, F and G through member 140A. The circuit is completed through G through the winding 224 and the contact to the extreme right of 120a through the lead 222 extending to the terminal B, which is connected to the movable contact in the switch 150. From this movable contact the circuit continues through the lead 220 to the terminal 203. If the glow tube is illuminated when this circuit contact is connected, it indicates that the prong or terminal seated in the prong socket 201 is energized.

Similar tests may be conducted upon the contact prong terminal 203. If the glow tube is also energized here, it indicates that the ballast tube is not open circuited. Similar tests may be made upon the prong terminals 202, 204 and 205, which normally are deenergized, as these represent prong terminals for dummy prongs. If it should be observed that any one or more of these dummy prongs are energized, it indicates a short circuit in the ballast tube. Instead of two prongs being energized in the ballast tube, three or more may be energized, that is, the resistance element in the ballast tube may be tapped.

"Normal" as used in the claims, is used to designate an arbitrary positioning of the prongs. At present a great number of tubes have the same prong arrangement. Where the same arrangement of the prongs is used in a great number of tubes, this is referred to as the normal position and corresponds to the contact N in the switch 150. There are some types of tubes where the prongs are arranged in a different order. These have been designated as X and Y positions on the switch 150, which position reverses the connection to the prongs. In the event a great number of tubes should appear on the market with some other prong arrangement and such tubes are used very extensively, probably so as to replace most of the other tubes now on the market, some other position on the switch 150 might be referred to as a normal position. The X and Y contacts on the switch are referred to as special. This takes care of tubes having some prong arrangement different from that used on the majority of tubes now on the market.

Throughout the specification and claims the tubes connected into the normal circuit network will be referred to as normal tubes and the tubes connected into the special circuit networks will be referred to as tubes having unusual characteristics, or similar terminology.

The voltage values shown on the drawing referred to in the specification are merely illustrative. Likewise, the number of sockets, the number of contacts, the several switches and the indicia used thereon have been shown for the purpose of illustration, to illustrate the principle upon which the tester operates and not as a limitation. Instead of using a milliammeter and instead of using a glow tube, other current indicating devices may be used for conducting the tests. The showing is merely for the purpose of illustration. Any other arrangement incorporating the inventive idea and performing the mode of operation as set forth herein may be utilized within the purview of this invention.

Having thus described my invention, I claim:

1. A circuit network for testing any tube selected from a number of various types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, and a second switch for interconnecting a normal circuit network for testing normal tubes and having special circuit connections for testing tubes having unusual characteristics.

2. A circuit network for testing any tube selected from a number of various types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, and a short circuit and excessive leakage current indicating device connected to said preselector switching means, said preselector switching means having one position where all of the sockets are connected to said device for measuring the currents flowing through certain of said electrodes of any type of tube selected for test to determine whether excessive currents flow through the tube.

3. A circuit network for testing any tube selected from a number of various types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, a short circuit and excessive leakage current indicating device connected to said preselector switching means, said preselector switching means having one position where all of the sockets are connected to said device for measuring the currents flowing through certain of said electrodes of any type of tube selected for test to determine whether or not excessive currents flow through the tube.

4. A circuit network for testing any tube selected from a number of various types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, a current measuring device connected to said preselector switching means, and a switch for connecting the predetermined circuits into the circuits selected by the preselector switching means, the selected tube under test governing the circuit selected by the preselector switching means 5. A circuit network for testing any tube selected from a number of various types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, an auxiliary switch for connecting one circuit selected from a plurality of circuits to the preselector switching means for supplying proper circuit connections to the particular socket utilized with the tube under test, and means for ascertaining the condition of the tube under test.

6. A circuit network for testing any tube selected from a number of various types of tubes having various numbers of electrodes, said circuit network including a plurality of sockets fitting various types of tubes, preselector switching means interconnected to the various prongs of the sockets for connecting the sockets into the circuit network so that the sockets are adapted for testing all tubes of the same general class as the tube selected for test, a circuit selecting switch for interconnecting into the preselector switching means, a circuit selected from a plurality of circuits, said selected circuit being selected for a particular tube to be tested, and a special switching device for connecting into the network special circuits for testing tubes having unusual characteristics.

7. A circuit network for testing any tube selected from a number of various types of tubes having various numbers of electrodes, said circuit network including a power transformer, a plurality of sockets having various prong spacings for receiving types of tubes, preselector switching means interconnected to the various prongs of the sockets for connecting the sockets into the circuit network so that the sockets are adapted for testing all tubes of the same general class as the tube selected for test, circuit selecting means for interconnecting into the preselector switching means proper circuits for testing the tube under test, and a secondary voltage transfer regulator for regulating the voltage input into the tube tester.

8. A circuit network for testing any tube selected from a number of various types of tubes having various numbers of electrodes, said circuit network including a power transformer, a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, circuit selecting means for connecting the proper circuit to the preselector switching means for testing the selected tube, and a secondary voltage transfer regulator device interconnected between the line input and the secondary of the transformer to regulate the voltage supplied to the tube under test.

9. A circuit network for testing any tube selected from a number of various types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, said preselector switching means having one position common to all of the sockets, excessive current indicating means connected to said one position for determining whether excessive currents flow through the tube, and circuit selecting means associated with the preselector switching means for selecting the proper circuits for the tube under test.

10. A circuit network for testing any tube selected from a number of types of tubes having various numbers of electrodes, said circuit network including a plurality of sockets having various prong spacings for receiving various types of tubes, preselector switching means interconnected to the various prongs of the sockets for connecting the sockets into the circuit network so that the sockets are adapted for testing all tubes of the same general class as the tube selected for test, circuit selecting means for connecting the proper circuit to the preselector switching means for testing the selected tube, and a normal test switch having one position for connecting a circuit into the network for testing normal tubes and another position selected from several positions for connecting a circuit into the circuit network for testing tubes of unusual characteristics.

GEORGE M. BUCHARD.